March 3, 1959 — O. DOERNER — 2,876,369
PORTABLE POWER DRILL
Filed April 28, 1955 — 2 Sheets-Sheet 1
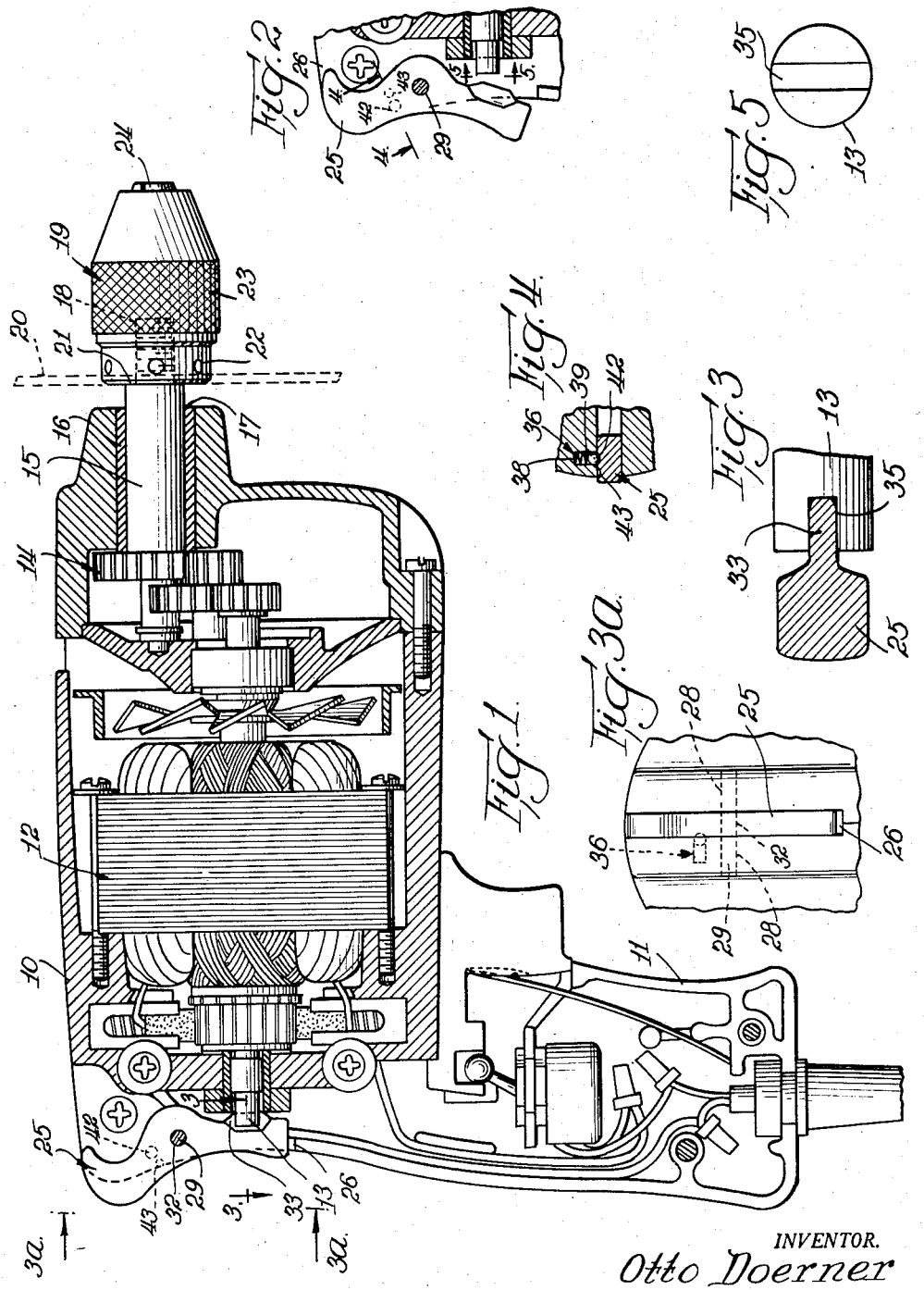
INVENTOR.
Otto Doerner March 3, 1959  O. DOERNER  2,876,369
PORTABLE POWER DRILL
Filed April 28, 1955  2 Sheets-Sheet 2
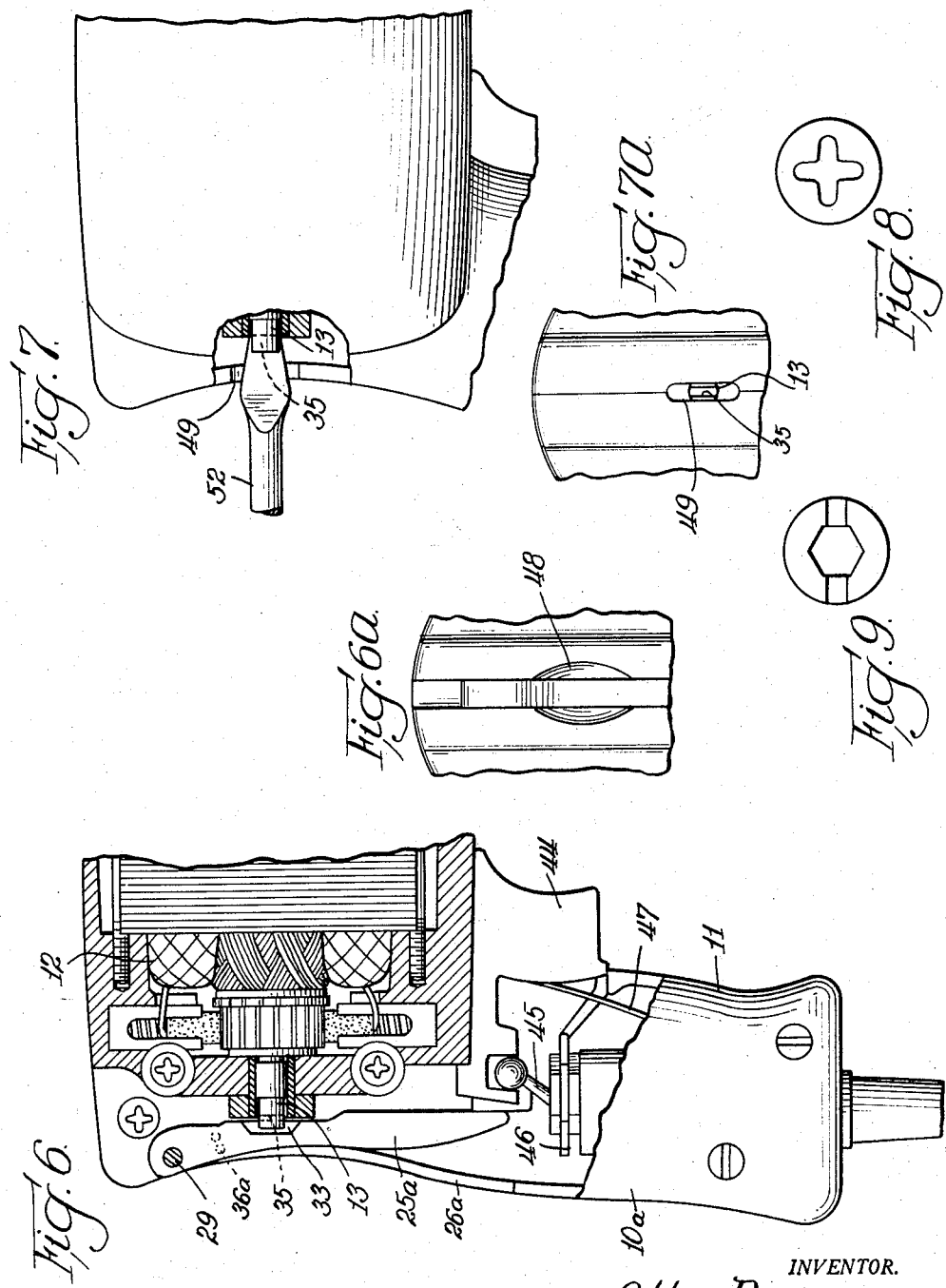
INVENTOR.
Otto Doerner
BY United States Patent Office 2,876,369
Patented Mar. 3, 1959

2,876,369

PORTABLE POWER DRILL

Otto Doerner, Chicago, Ill., assignor to Dormeyer Corporation, Chicago, Ill., a corporation of Illinois Application April 28, 1955, Serial No. 504,535

10 Claims. (Cl. 310—77)

This invention relates to portable power drills and more particularly to a power drill having means for preventing rotation of the spindle to facilitate mounting of the chuck on the spindle and the rotation of the chuck for insertion and removal of drill bits.

Heretofore, it was difficult to rotate the conventional knurled collar of the chuck of a power drill to expand or contract its jaws because of the fact that the spindle was freely rotatable along with the motor shafts. Furthermore, difficulty was experienced in mounting a chuck on the spindle for the same reason. Attempts have been made in the past to lock the spindle during these operations, but these efforts have been unsatisfactory because of the necessity for immobilizing the entire drill by means of a vise or the like, so that the hands of the operator are available to effect locking of the spindle while the chuck collar is rotated.

With the foregoing in mind, a principal object of the present invention is to provide a power drill wherein rotation of the spindle may be prevented efficiently and conveniently so that a chuck or other accessories such as a saw blade or router can be interchangeably used with the greatest of ease.

A further object of the invention is to provide a power drill wherein locking of the spindle is afforded for easy operation of the chuck by the operator without the need for a vise or hand tools.

Another object of the invention is to provide a drill of the stated type wherein the locked condition of the spindle is apparent upon inspection and the likelihood of inadvertent energization of the motor circuit is minimized.

A further object of the invention is to provide a drill of the mentioned character in which actuation of the conventional trigger switch automatically disengages the spindle for free rotation.

A more particular object of the invention is to provide a power drill of the given type having a housing in which a slot is formed for reception of a latch which is pivotally mounted in the slot and is provided at one end with a blade for engaging one end of the motor shaft. In a modified form of the present invention the latch is so formed to be engaged by the conventional trigger switch for effecting disengagement of the blade from the shaft.

Other and further objects, advantages and features of the present invention will be apparent to those skilled in the art from the following description, taken in conjunction with the accompanying drawings in which similar reference characters relate to similar parts, and in which:

Fig. 1 is an elevational view, partly in section, of a power drill made in accordance with the present invention and showing the latch in operative position;

Fig. 2 is a fragmentary elevational view showing the latch in a position it assumes when disengaged;

Fig. 3 is an enlarged plan view taken substantially on line 3—3 of Fig. 1;

Fig. 3a is a fragmentary elevational view of the power drill of Fig. 1 as viewed from the left in that figure;

Fig. 4 is an enlarged sectional plan view taken substantially on line 4—4 of Fig. 2;

Fig. 5 is an elevational view taken substantially on line 5—5 of Fig. 2;

Fig. 6 is a fragmentary elevational view, in section, of a power drill made in accordance with a modified form of the present invention;

Fig. 6a is a fragmentary elevational view of the power drill of Fig. 6 as viewed from the left in that figure;

Fig. 7 is an elevational view, partly broken away and partly in section, of another modified form of the present invention;

Fig. 7a is a fragmentary elevational view of the power drill of Fig. 7 as viewed from the left in that figure; and Figs. 8 and 9 are views similar to Fig. 5 but showing other configurations of a recess at one end of the motor shaft.

With reference to the drawings and, more particularly to Fig. 1, the portable power tool of the present invention is of the gun type and includes a housing or casing 10 having a piston grip 11 for easy grasping. Mounted for rotation in the housing 10 is an electric motor 12 having an elongated shaft 13. The right end of the shaft 13, as viewed in Fig. 1, is operatively connected by means of a gear train 14 to a spindle 15. The spindle 15 is journalled in a bearing 16 and extends through an opening 17 in the housing 10 to terminate in a stud 18 of reduced diameter, which is threaded for reception of a chuck 19. The inner end of the chuck 19 is provided with a plurality of radially extending circumferentially spaced apertures 22 for reception of a wrench, pin or nail (not shown) to hold the chuck body to tighten or loosen the chuck on a drill, or to loosen the chuck body from the spindle 15, for its removal as when it may be desirable to mount a circular saw blade thereon as indicated in broken lines 20 to rest against the shoulder 21 for square positioning.

In order to accomplish this latter, means are provided for locking the shaft 13 to prevent rotation during mounting or removal of the chuck 19 or any other accessories on the stud 18, and, while collar 23 of the chuck 19 is rotated to expand or contract jaws 24 for insertion or removal of drill bits. In the present instance, this means takes the form of a latch 25 which is pivotally mounted in a slot 26 at the end of the housing 10 opposite to the opening 17.

Referring now to Fig. 3a, the slot 26 takes the form of recesses in the shell halves of which the housing 10 is comprised. Openings 28 are formed in the confronting faces of the recesses for the reception of a pin 29. The latch 25 is provided with a centrally disposed transversely extending aperture 32 through which the pin 29 passes. At the inner edge of the lower portion of the latch 25 is formed a blade 33. The left end of the shaft 13, as viewed in Fig. 1, extends outwardly into close spaced relation to the casing 10. This end face is formed with a recess for interlocking engagement with the blade 33. In the form of the invention shown in Fig. 1, this recess takes the form of a kerf 35. When the latch 25 is in the position shown in Fig. 1, rotation of the shaft 13 and the spindle 15 is prevented.

In Fig. 2 is shown the latch 25 in the position it assumes when the power drill is in operation. In this position the blade 33 is out of engagement with the kerf 35 and thus free rotation of shaft 13 is afforded. For selectively retaining the latch 25 either in the position shown in Fig. 1 or in the position shown in Fig. 2, a ball detent 36 is provided. This detent is disposed in a cylindrical recess 38 in one of the confronting faces of the slot 26 and includes a spring 39 arranged in the recess 38 and a ball 42 urged outwardly by this spring. The adjacent face of the latch 25 is provided with a pair of arcuately spaced recesses 43. When the lower portion of the latch 25 is urged inwardly, the ball 42 is received in the innermost of the recesses 43 to retain the latch in locked position. When the latch 25 is in the position shown in Fig. 2 it is retained in this position by the engagement of the ball 42 with the outermost of the recesses 43 as will be understood. The outer edge of the latch 25 is shaped to conform generally with the contour of the left end, as viewed in Fig. 1, of the casing 10. In the position shown in Fig. 2, the lower portion of latch 25 protrudes through the slot 26.

In Fig. 6 is shown a modified form of the present invention in which the shaft 13 may be locked for mounting of a chuck and in which inadvertent operation of the drill with the latch 25 in locked position is precluded. In this form of the invention, a greatly elongated slot 26a is provided for the pivotal reception of an elongated latch 25a. This latch 25a is mounted at its upper end on a pin 29 similar to that of the principal form of the invention. The inner marginal edge of the lower end of the latch 25a extends into abutment with a trigger 44 which engages a toggle 45 of a toggle switch 46 to initiate or terminate operation of the motor 12. This trigger 44 is normally urged to the right by a flat spring 47 which is fixed at its lower end to the casings. As the trigger 44 is moved by the finger of the operator to the left, as viewed in Fig. 6, the rear surface of the trigger, being in engagement with the inner edge of the latch 25a moves with the lower portion to the left and thus disengages the latch from the motor shaft. By this arrangement, inadvertent operation of the power drill of the present invention with the motor shaft locked is effectively prevented. In this form of the invention also, means are provided for retaining the latch 25a either in the position shown in Fig. 6 or in a position flush with the outer surface of the housing 10a. This means takes the form of a ball detent assembly 36a similar to assembly 36 in the principal form of the invention. To facilitate movement of the latch 25a into the position shown in Fig. 6, the end of the housing 10a is dished as at 48 in Fig. 6a. The recess thus formed permits the operator to urge the latch 25a with his thumb to the limit position in which the blade 33 is received in the kerf 35.

Referring now to Fig. 7, a further modified form of the invention is shown in which the need for the latch 25 in the other forms of the invention is obviated. The means for locking in this form of the invention includes a short slot 49 in the housing through which is passed a screw driver 52. The screw driver 52 engages the kerf 35 to lock the shaft 13 is position for mounting of the chuck 19 as will be understood. The slot 49 may be dimensioned to accommodate a coin or flat disc if desired. In this instance the coin or disc may be conveniently grasped by the hand of the operator which holds the drill grip. When either a screw driver or coin is used in this form of the invention no pressure is required to effect locking of the shaft because of the interlocking relation of these members with the edges of the slot 49.

In Figs. 8 and 9 are shown alternate forms of recesses for the left end of the shaft 13. It will be understood that when these recesses are used, a correspondingly formed engaging member is employed instead of the blade of the form of the invention shown in Figs. 1 and 6. In the form of the invention shown in Fig. 7 a suitable opening conforming to the recess selected may be utilized.

It will be apparent that this invention may be embodied in devices which differ in many respects in detail from the particular embodiment disclosed herein. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. A portable power drill of the gun type comprising a housing, a motor rotatably mounted in said housing, said motor having an elongated shaft, a spindle operatively connected to one end of said shaft, the other end of said shaft extending into proximate spaced relation to said housing, an elongated slot formed in said housing, a latch pivotally mounted in said slot, a recess formed in said other end of the shaft, said latch being formed to engage said recess to prevent rotation of said spindle to facilitate mounting of a chuck thereon, and a trigger for energizing said motor, said trigger being arranged in abutment with said latch so as to effect disengagement thereof from said shaft when the motor is energized.

2. A portable power tool of the gun type comprising a housing, a motor rotatably-mounted in said housing, said motor having an elongated shaft, a spindle operatively connected to one end of said shaft, the other end of said shaft extending into proximate spaced relation to said housing, an elongated slot formed in said housing, a latch pivotally-mounted in said slot, said latch being operative to engage said other end of the shaft to prevent rotation thereof while mounting a chuck on said spindle, and a switch for energizing said motor, said switch being operative upon actuation to disengage said latch from said other end of the shaft.

3. A portable power drill comprising a housing, a motor rotatably mounted in said housing, said motor including an elongated shaft, a spindle operatively connected to one end of said shaft, the other end of said shaft extending into proximate spaced relation to said housing, a kerf formed in said other end of the shaft, a latch pivotally mounted on said housing for movement to alternate positions and having a portion thereof extending beyond said housing for manual movement towards and away from said other end of the shaft, said latch being formed with a blade for engagement with said kerf when said portion is moved towards said other end of the shaft to lock said spindle against rotation, and means carried by the housing for releasably holding said latch in each of said alternate positions.

4. A portable power drill comprising a housing, a motor rotatably mounted in said housing, said motor including an elongated shaft, a spindle operatively connected to one end of said shaft, the other end of said shaft extending into proximate spaced relation to said housing, said other end of said shaft being formed with a recess, a latch partially extending beyond said housing for manual movement and pivotally mounted on said housing for movement towards and away from said spindle, said latch being formed with a tool shape mating with said recess for engagement therewith to lock said spindle against rotation when said latch is moved towards said spindle, and means carried by the housing for releasably holding said latch in its locked position.

5. The combination called for in claim 4 including means for manually moving said latch out of engagement with said recess to a position of rest.

6. A portable power drill comprising a housing, a motor rotatably mounted in said housing, said motor including an elongated shaft, a spindle operatively connected to one end of said shaft, the other end of said shaft extending into proximate spaced relation to said housing, a kerf formed in said other end of the shaft, a latch pivotally mounted on said housing and having a blade extending from said other end of the shaft to a point beyond said housing, said blade engaging said kerf to lock said spindle against rotation when said blade is manually moved towards said other end of the shaft and releasable means for retaining the latch in said spindle locking position.

7. A portable power drill comprising a housing having a hollow pistol grip handle with an opening through its wall near the top thereof, a motor rotatably mounted in said housing, said motor including an elongated shaft, a spindle operatively connected to one end of said shaft, the other end of said shaft extending into proximate spaced relation to said housing at said opening, a kerf formed in said other end of the shaft, a latch pivotally mounted on said housing and having a blade portion received in said opening for movement from a resting position to another position in which said blade engages in said kerf to lock said spindle against rotation, means for manually returning said blade to its resting position, and means for selectively retaining said latch in either one of said positions.

8. A portable power drill comprising a housing, a motor rotatably mounted in said housing, said motor having an elongated shaft, a spindle operatively connected to one end of said shaft, the other end of said shaft extending into proximate spaced relation to said housing, an elongated slot formed in said housing, a latch pivotally mounted in said slot and having a portion thereof extending beyond said housing, a kerf formed in said other end of the shaft, said latch portion having an edge engageable in said kerf when moved towards said shaft to prevent rotation of said spindle, and means for manually moving said latch out of engagement with said kerf to a position of rest.

9. A portable power drill comprising a housing, a motor rotatably mounted in said housing, said motor having an elongated shaft, a spindle operatively connected to one end of said shaft, the other end of said shaft extending into proximate spaced relation to said housing, said other end being formed with a kerf, an elongated slot formed in said housing in register with said other end of the shaft to support a bladed tool or the like in said slot in alignment with said kerf for interlocking said housing and shaft against relative rotation.

10. A portable rotary power tool comprising a housing, a motor rotatably mounted in said housing, said motor including an elongated shaft, a spindle operatively connected to one end of said shaft, the other end of said shaft extending into proximate spaced relation to said housing, a latch pivotally mounted intermediate its ends on said housing and having portions at opposite ends alternately extending a substantial distance beyond said housing when the other end is moved inwardly, one of said portions engaging said other end of said shaft to lock it against rotation when the other end extends substantially beyond said housing.

References Cited in the file of this patent

UNITED STATES PATENTS

| | | |
|---|---|---|
| 1,173,764 | Baldwin | Feb. 29, 1916 |
| 1,805,164 | Carter | May 12, 1931 |
| 2,439,803 | Giesen | Apr. 20, 1948 |
| 2,525,839 | Sparklin | Oct. 17, 1950 |
| 2,702,098 | Staak | Feb. 15, 1955 |